United States Patent
Fujioka

(10) Patent No.: US 6,297,802 B1
(45) Date of Patent: *Oct. 2, 2001

(54) WIRELESS COMMUNICATION SYSTEM HAVING A PLURALITY OF TRANSMITTING PARTS ONE OF WHICH IS SELECTIVELY USED

(75) Inventor: Susumu Fujioka, Kanagawa (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/933,350

(22) Filed: Sep. 19, 1997

(30) Foreign Application Priority Data

Sep. 20, 1996 (JP) .................................................. 8-269158

(51) Int. Cl.[7] .............................. G09G 5/00; G09G 5/08; H04N 5/44

(52) U.S. Cl. ........................... 345/156; 345/158; 348/734

(58) Field of Search .................................... 345/158, 156; 348/734

(56) References Cited

U.S. PATENT DOCUMENTS

| | | | | |
|---|---|---|---|---|
| 5,339,095 | * | 8/1994 | Redford | 345/158 |
| 5,435,573 | * | 7/1995 | Oakford | 345/158 |
| 5,633,742 | * | 5/1997 | Shipley et al. | 359/137 |
| 5,677,909 | * | 10/1997 | Heide | 370/347 |
| 5,710,623 | * | 1/1998 | Kim | 345/158 |
| 5,796,387 | * | 8/1998 | Curran et al. | 345/158 |
| 5,867,146 | * | 2/1999 | Kim et al. | 345/158 |
| 5,877,745 | * | 3/1999 | Beeteson et al. | 345/156 |
| 5,982,415 | * | 10/1999 | Sakata | 348/17 |

FOREIGN PATENT DOCUMENTS

| | | |
|---|---|---|
| 4-55992 | 2/1992 | (JP) . |
| 7-67093 | 3/1995 | (JP) . |
| 9-247097 | 9/1997 | (JP) . |

OTHER PUBLICATIONS

Nikkei Electronics, No. 628, 1995, pp 101–110.

J. Tajnai, et al. Infrared Data Association Serial Infrared Physical Layer Link Specification, Infrared Data Association, (1995) Version 1.1e.

A. Seaborne, et al. Infrared Data Association Link Management Protocol, Infrared Data Association, (1995) Version 1.1e.

T. Williams, et al. Infrared Data Association Serial Infrared Link Access Protocol (IrLAP), Infrared Data Association, (1994) Version 1.0.

* cited by examiner

Primary Examiner—Richard Hjerpe
Assistant Examiner—Duc Q. Dinh
(74) Attorney, Agent, or Firm—Oblon, Spivak, McClelland, Maier & Neustadt, P.C.

(57) ABSTRACT

A wireless communication system in which an angle range of an operational device such as a keyboard or a drawing input device or other peripheral devices are usable, is expanded, and the operability of the device is improved. The system includes at least one data sending unit and a data processing unit remote from the data sending unit. The data processing unit includes a plurality of wireless data communication units each of which includes a wireless data receiving element capable of receiving data transmitted from the data sending unit by wireless communication. The wireless data communication units are directed to different directions. The data processing unit performs a wireless communication with the data sending unit by selecting one of the wireless data communication units.

15 Claims, 15 Drawing Sheets

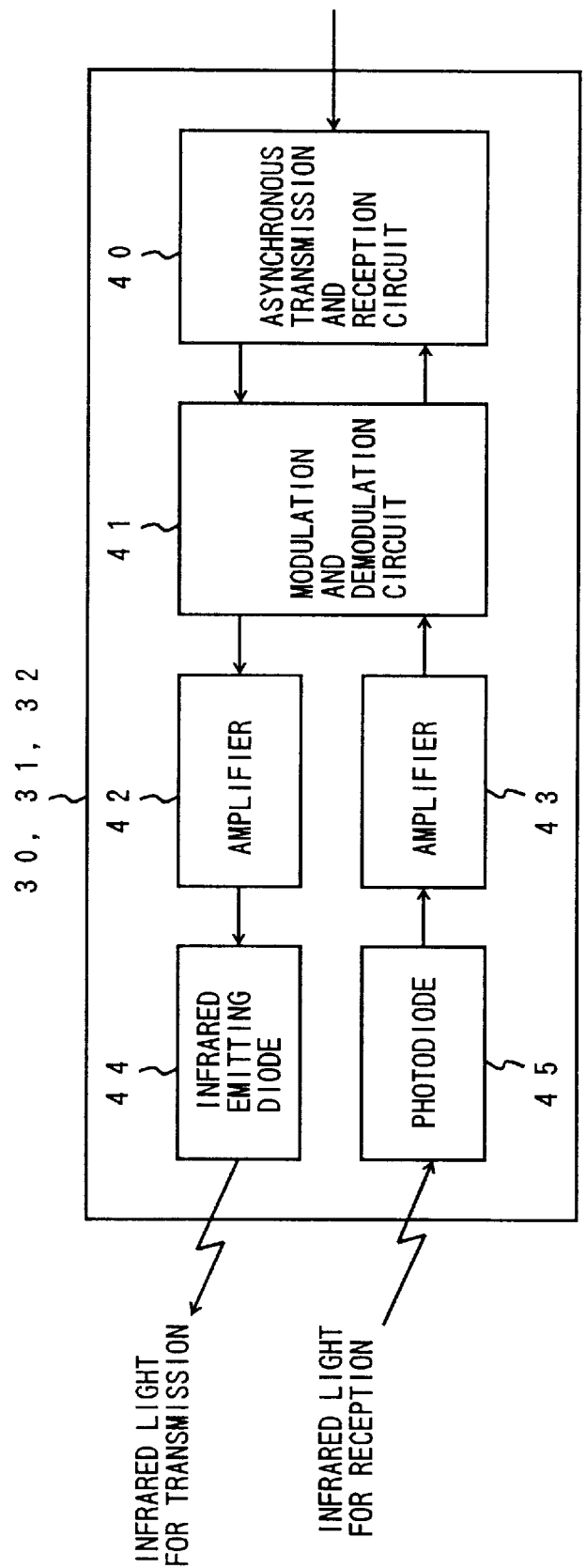

WIRELESS COMMUNICATION SYSTEM HAVING A PLURALITY OF TRANSMITTING PARTS ONE OF WHICH IS SELECTIVELY USED

BACKGROUND OF THE INVENTION

1. Field of the Invention

The present invention relates to a wireless communication system and, more particularly, to a wireless communication system which is suitable for a situation in which a data processing apparatus preforming wireless communication is shared by a plurality of users.

As an example of such an application, there is a situation in which a wireless keyboard is used in a wide range (angle) with respect to a personal computer which communicates with the wireless keyboard. Additionally, there is a situation in which communication between a television or video conference terminal unit and operation of a keypad is performed by wireless communication, and the keypad is used in a wide range (angle) with respect of the video conference terminal unit.

2. Description of the Related Art

When communication between a data processing apparatus and a peripheral device thereof is achieved by wireless communication, available method include radio frequency and infrared frequency transmission. Since the method using infrared transmission is achieved by a simple circuit as compared to the method using radio frequency, product cost can be reduced. Additionally, the method using infrared communication has an advantage in that power consumption is low. Accordingly, the method using an infrared is widely used, for example, in a remote control system of a television set.

In the infrared communication field, each manufacturer used a different transmission system until the Infrared Data Association, which was founded in July, 1993, standardized the IrDA system which is a standard system of the infrared data communication. The IrDA system has become popular mainly as an application for a wireless communication system between a personal computer and a peripheral device since the IrDA system can be constructed by inexpensive hardware such as a modulation and demodulation circuit, a light emitting element and a light receiving element.

The maximum communicable distance of the IrDA system is 1 meter, and 3 meters as an option. An angle range of the emitted light is ±15 degrees to ±30 degrees. The receivable angle range is more than ±15 degrees.

In recent years, a personal computer video conference system has become popular in which an application is shared by a remote personal computers via a communication line and transmission of audio data and video image data is performed between the remote terminals. The personal computer video conference system may be shared by a plurality of people who are attending the conference. In such a case, an operational device such as a keyboard or a drawing input device is shared by the plurality of attendants. When a plurality of attendants use the operational device in turn, it may be requested to move the operational device to a position in front of the attendant who will be using the device. At this time, if the operational device is connected by a connection cable to the personal computer, there is a disadvantage in that the attendants feel an inconvenience to draw the connection cable when moving the operational device.

Such an inconvenience may be eliminated by removing the connection cable and providing an infrared communication system according to the IrDA system instead.

Japanese Laid-Open Patent Application No. 4-55992 discloses a data collection method by a handy terminal in which a personal computer collects data from the handy terminal by using infrared communication.

Additionally, Japanese Laid-Open Patent Application No. 7-67093 discloses a video conference apparatus and a control apparatus provided with a wireless communication function in which wireless communication is provided between a terminal device and peripheral devices so that each of the peripheral devices can be operated by an operational panel of the terminal device.

As mentioned above, if the connection cable is removed and the infrared communication system is provided instead, the inconvenience caused by drawing the connection cable can be eliminated. However, there is a restriction with respect to an angular position of the operational device relative to a light emitting part of the personal computer by an angle range of an emitted light. That is, there is a problem in that the operational device cannot be used outside of the range of emission of an infrared emitted from the personal computer. For example, when the personal computer video conference system is shared by three people, the people located on each side must pay attention to a position of the operational device when it is used. Thus, there is a problem in that efficient operation of the device is deteriorated.

In the method disclosed in the above-mentioned Japanese Laid-Open Patent Application No. 4-55992, since the data transmission by infrared communication is a one way transmission similar to the remote control system used by a television set, bidirectional communication cannot be performed. Thus, a high-quality data communication such as one having an error correction function cannot be achieved.

The forgoing document discloses that "since a receiver provided to the information processing apparatus such as a personal computer performs a crash control of data when infrared signals are simultaneously transmitted by a plurality of handy terminals, and the outputs the data to an RS232C interface after arranging the data, the data from a plurality of handy terminals can be received by a single receiver". However, a specific method of the crash control of data is not provided and, thus, it is not guaranteed that discarding of data does not occur.

In the apparatus disclosed in the above-mentioned Japanese Laid-Open Patent Application No. 7-67093, transmission of information between a digitized tablet or a microphone used by the attendant and the video conference apparatus is performed by optical communication such as infrared communication. However, the digitizer tablet or the microphone is connected to the optical communication unit by a connection cord. Thus, when the peripheral device positioned in front of the attendant is moved, there is a problem in that the attendant may feel an inconvenience to move the connection cord.

SUMMARY OF THE INVENTION

It is a general object of the present invention to provide an improved and useful wireless communication system in which the above-mentioned problems are eliminated.

A more specific object of the present invention is to provide a wireless communication system in which an angle range, in which operational devices such as a keyboard or a drawing input device or other peripheral devices are usable, is expanded, and thus the operability of the device is improved.

It is another object of the present invention to provide a wireless communication system suitable for a video conference system in which an operational device for inputting data can be moved in a wide angle range with respect to a main unit without performing an inconvenient operation to establish a wireless communication connection between the operational device and the main unit.

It is a further object of the present invention to provide a wireless communication system suitable for a video conference system in which a plurality of operational devices for inputting data can be used with a main unit so that one of the operational devices which is requested for use can be connected to the main unit to perform wireless data communication.

In order to achieve the above-mentioned objects, there is provided according to one aspect of the present invention a wireless communication system comprising:

at least one data sending unit; and a data processing unit remote from the data sending unit, the data processing unit including a plurality of wireless data communication units each of which includes a wireless data receiving element capable of receiving data transmitted by wireless communication from the data sending unit, the wireless data communication units being directed in different directions, wherein the data processing unit performs wireless communication with the data sending unit by selecting one of the wireless data communication units.

According to the above-mentioned invention, since the data processing unit has a plurality of receiving element which are directed in different directions, an angle range in which the data sending unit is usable is expanded, resulting in convenient use of the system.

In one embodiment according to the present invention, a selection of the one of the wireless data communication units may be based on a selection command provided from the data sending unit.

Additionally, each of the wireless data communication units may include a wireless data transmitting element for transmitting data to the data sending unit by the wireless communication. This structure allows a bidirectional data communication between the data processing unit and the data sending unit. Thus, a high quality wireless communication can be achieved by providing an error detecting function and a recovery function.

Additionally, in the above-mentioned invention, the data processing unit may attempt an establishment of a wireless communication connection with the data sending unit by sequentially switching the wireless data communication units at a predetermined time interval so that the wireless communication is performed when the wireless communication connection is established. Thus, the operator is not required to designate one of the wireless data communication units to be used.

In one embodiment of the present invention, a plurality of the data sending units may be provided each of which is capable of being set in a communication mode in which the wireless communication with the data processing unit is permitted, one of the data sending units which is set in the communication mode sending a response to the data processing unit so as to establish a communication connection when the one of the data sending units receives a request for establishing the communication connection from the data processing unit, the communication connection being disconnected when the communication mode is canceled.

According to the above-mentioned invention, since the connection between the data processing unit and the data sending unit is established by the selection command which is sent from one of the data sending units which requests the wireless data communication with the data processing unit, an unnecessary establishment of connection is not performed.

In one embodiment of the present invention, setting and cancellation of the communication mode may be instructed by an operator through the one of the data sending units.

Additionally, a plurality of the data sending units may be provided each of which is provided with a data buffer so that one of the data sending units stores data to be transmitted to the data processing unit in the data buffer when a communication connection between one of the data sending unit and the data processing unit is not established, the one of the data sending units sending a response to the data processing unit so as to establish a communication connection when the one of the data sending units receives a request for establishing the communication connection from the data processing unit so as to send the data stored in the data buffer to the data processing unit.

According to the above-mentioned invention, the communication connection is established only when the data is stored in the data buffer. That is, the communication connection is established only for the data sending unit which has data to be transmitted to the data processing unit. Thus, an unnecessary establishment of a connection is not performed. Additionally, the operator is not required to perform an operation to start the wireless communication. Thus, convenient use of the system can be achieved.

In one embodiment of the present invention, the wireless communication may use an infrared transmission to transmit data.

Additionally, the data processing unit may be a main unit of a video conference system, and the data sending unit may be a peripheral unit of the video conference system for inputting data to the main unit.

Additionally, there is provided according to another aspect of the present invention a wireless communication system comprising:

data sending means for sending data;

data processing means, remote from the data sending means, for processing the data received from the data sending means, the data processing means including data communication means for communicating with the data sending means by using wireless communication, the data communication means is capable of receiving the data transmitted in one of a plurality of angle ranges with respect to directivity of the data communication means; and angle range selecting means for selecting one of the plurality of angle ranges in which the data sending means is located.

According to the above-mentioned invention, since the data processing means is capable of receiving the data transmitted in a selected one the of angle ranges, a total angle range in which the data is receivable is expanded, resulting in convenient use of the system.

In one embodiment of the present invention, a selection of the one of the plurality of angle ranges may be based on a selection command provided from the data sending means.

Additionally, the data communication means may be capable of transmitting data to the data sending means through the wireless communication.

In the present invention, the data processing means may attempt an establishment of a wireless communication connection with the data sending means by sequentially switching the angle ranges at a predetermined time interval so that the wireless communication is performed when the wireless communication connection is established.

Additionally, there is provided according to another aspect of the present invention a data processing unit communicating by wireless communication with at least one data sending unit remote from the data processing unit, the data processing unit comprising:

a plurality of wireless data communication units each of which includes a wireless data receiving element capable of receiving data transmitted from the data sending unit, the wireless data communication units being directed in different directions; and selecting means for selecting one of the wireless data communication units so that the data processing unit communicates with the data sending unit by using the one of the wireless data communication units.

In one embodiment of the present invention, a selection of the selecting means may be based on a selection command provided from the data sending unit.

Each of the wireless data communication units may include a wireless data transmitting element capable of transmitting data to the data sending unit by wireless communication.

Additionally, the data processing unit according to the present invention may further comprise connection establishing means for attempting an establishment of a wireless communication connection with the data sending unit by sequentially switching the. wireless data communication units at a predetermined time interval so that the wireless communication is performed when the wireless communication connection is established.

Other objects, features and advantages of the present invention will become more apparent from the following detailed description when read in conjunction with the accompanying drawings.

BRIEF DESCRIPTION OF THE DRAWINGS

FIG. 3 is a block diagram of each of first, second and third infrared receiving and emitting modules shown in FIG. 2;

DETAILED DESCRIPTION OF THE PREFERRED EMBODIMENTS

Figure 1:
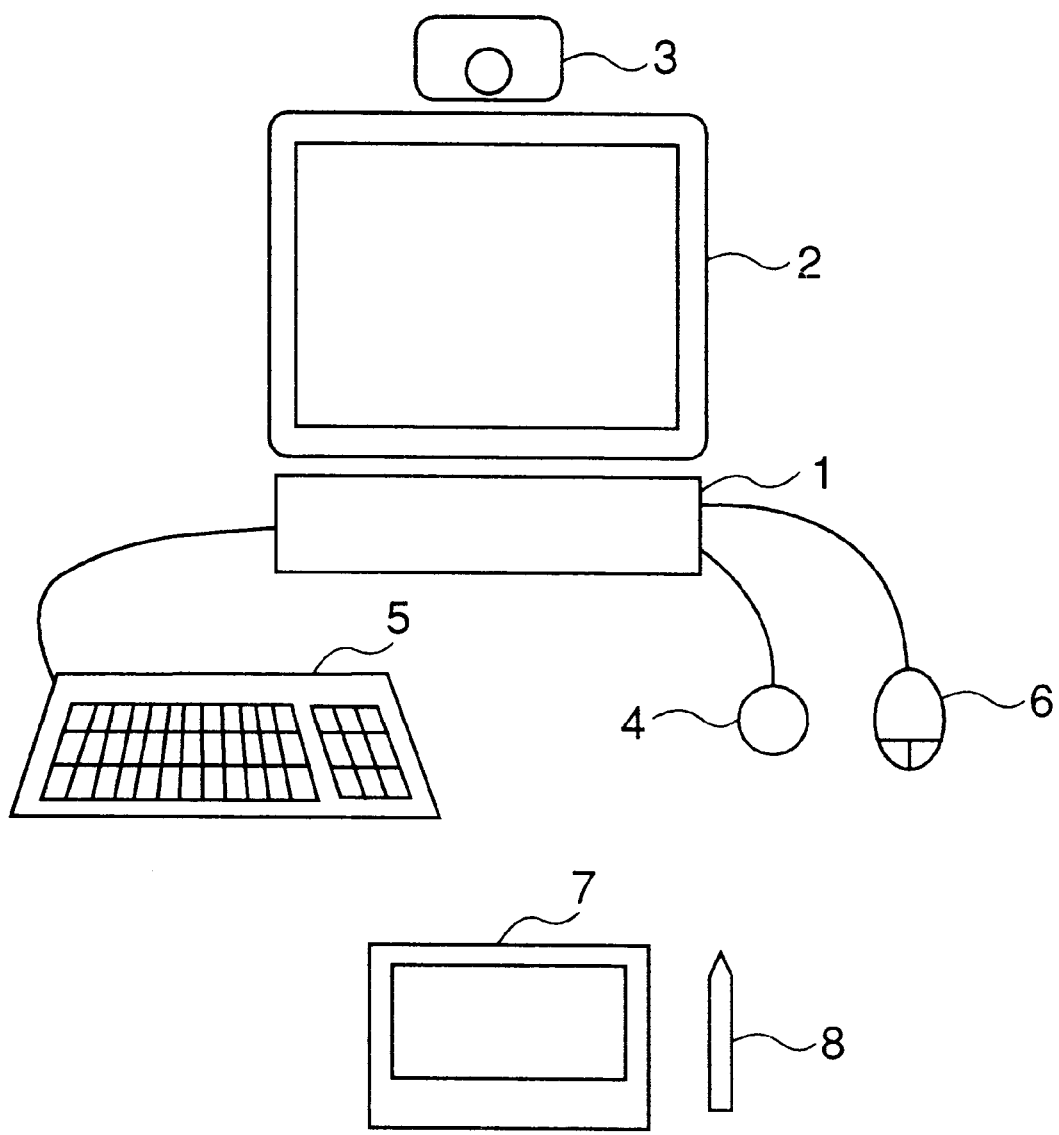
FIG. 1 is an illustration of a personal computer video conference system which uses a wireless communication system according a first embodiment of the present invention.

FIG. 1 is an illustration of a personal computer video conference system which uses a wireless communication system according to a first embodiment of the present invention. The personal computer video conference system shown in FIG. 1 comprises a personal computer 1, a CRT display 2, a video camera 3, a microphone 4, a keyboard 5, a mouse 6, a drawing input device 7, an electronic pen 8 used for inputting characters to the drawing input device 7.

Figure 2:
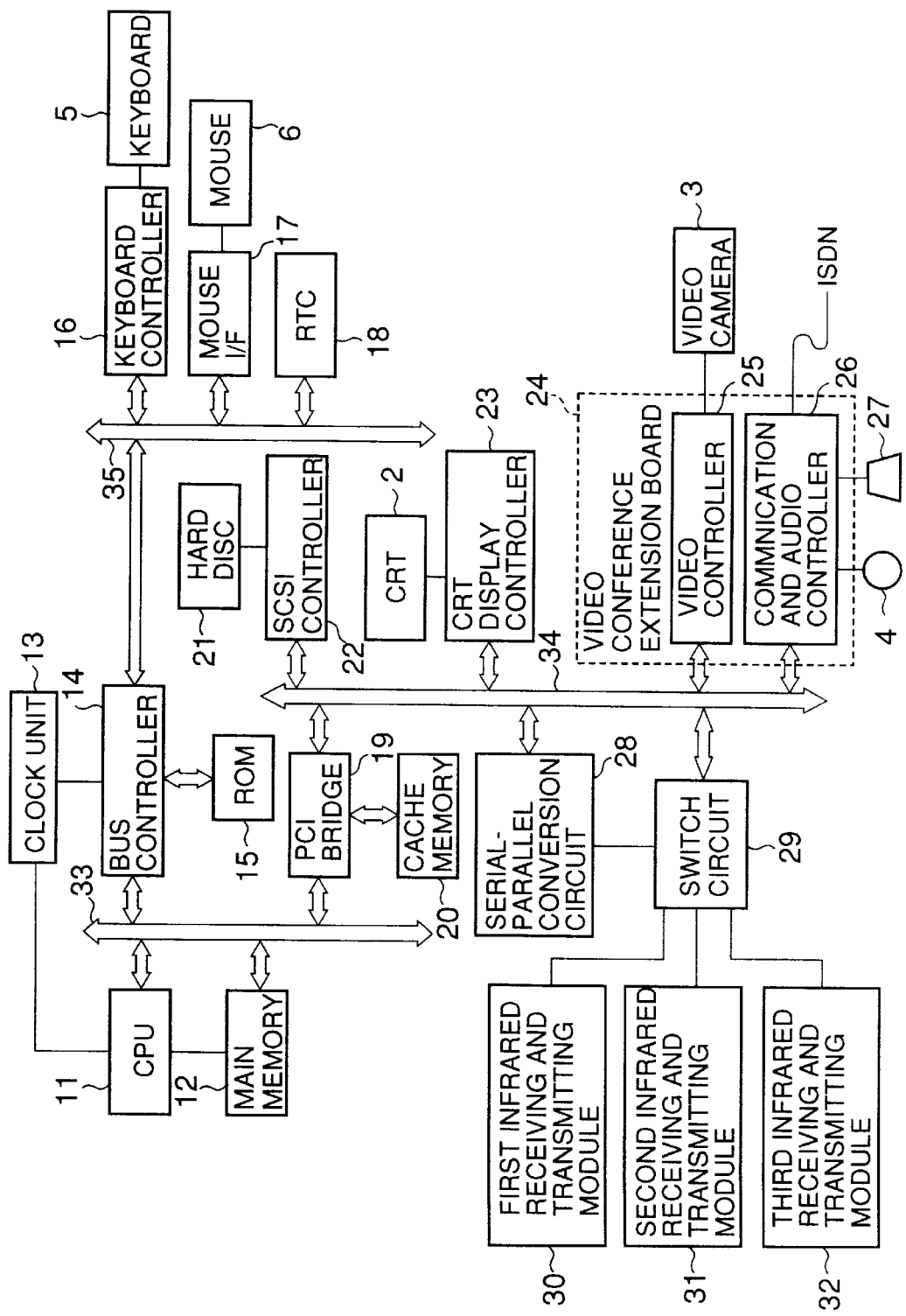
FIG. 2 is an illustration of a system structure of the personal computer video conference system.

FIG. 2 is an illustration of a system structure of the personal computer video conference system. In FIG. 2, a CPU 11, a main memory 12, a clock unit 13, a bus controller 14, a ROM 15, a keyboard controller 16, a mouse interface 17, a real time clock (RTC) 18, a peripheral component interface (PCI) bridge 19, a cache memory 20, a hard disc 21, a small computer system interface (SCSI) controller 22, a CRT display controller 23, a video conference extension board 24, a speaker 27, a serial-parallel conversion circuit 28, a switch circuit 29, a first infrared receiving and emitting module 30, a second infrared receiving and emitting module 31, and a third infrared receiving and emitting module 32, a CPU bus 33, a PCI bus 34, and an X bus (internal bus) 35 are included in the personal computer The CPU 11 executes control process programs of an operating system and various application programs stored in the ROM 15. The main memory 12 comprises a dynamic random access memory (DRAM), and is used as a work area for the CPU 11. The clock unit 13 comprises a quartz oscillator and a dividing circuit so as to generate a clock signal for controlling timing of operations of the CPU 11 and the bus controller 14. The bus controller 14 controls a data transfer on the CPU bus 33 and the X bus 35. Programs for booting the system when power is turned on and programs for controlling various devices are written in the ROM 15.

The keyboard controller 16 converts serial data input from the keyboard into parallel data. The mouse interface 17 has a port for connection of a mouse, and is controlled by a mouse driver (control program). The real time clock (RTC) 18 is a date clock which is backed up by a battery.

The peripheral component interface (PCI) bridge 19 performs a data transfer between the PCI bus and the CPU 11 by using cache memory 20. The cache memory 20 comprises a DRAM, and is used by the PCI bridge 19.

The hard disc 21 stores system software, various application programs and a number of sets of user data. The SCSI controller 22 is an interface for the hard disc 21 so as to perform a high-speed data transfer with the hard disc 21.

The CRT display controller 23 converts character and graphic data or video data supplied by the video controller 25 from digital data into analog data, and controls a display operation of the data on the CRT display 2.

The video conference extension board 24 comprises a video controller 25 and a communication and audio controller 26, and is mounted to a PCI extension bus slot of the personal computer 1. The video controller 25 converts the analog video signal supplied by the video camera 3 into digital data, and supplies the digital data to the CRT display controller 23. The video controller 25 encodes the digital data into compressed data in accordance with the ITU-T recommendation H.261, and outputs the compressed data to the communication and audio controller 26. Additionally, the video controller 25 decodes compressed data supplied by the communication and audio controller 26 in accordance with the ITU-T recommendation G.261, and supplies the expanded data to the CRT display controller 23. The communication and audio controller 26 is connected with the microphone 4 and the speaker 27, and includes an audio codec, a multiplexer control unit, a D-channel control unit and an ISDN interface so as to process mainly hardware of the communication control. The audio codec preforms an analog to digital conversion and an encoding operation in accordance with ITU-T recommendation G.722. The multiplexer and demultiplexer control unit controls a multiplexing and demultiplexing operation of various types of media data in accordance with the ITU-T recommendation H.221. The D-channel control unit performs a call connection and disconnection using the D-channel.

The serial-parallel conversion circuit 28 is used in the infrared data communication so as to convert the transmission data from parallel data to serial data and to convert the reception data form serial data to parallel data. The switch circuit 29 connects one of the first, second and third infrared receiving and emitting modules 30, 31 and 32 to the serial-parallel conversion circuit 28 so as to switch the infrared receiving and emitting module to be used. The first, second and third infrared receiving and emitting modules 30, 31 and 32 are circuits necessary for performing the infrared communication according to the IrDA system. Hereinafter, the infrared receiving and emitting module may be simply referred to as an infrared module.

FIG. 3 is an illustration of a block diagram of each of the first, second and third infrared receiving and emitting modules 30, 31 and 32. As shown in FIG. 3, each of the first, second and third infrared receiving and emitting modules 30, 31 and 32 comprises an asynchronous transmission and reception circuit 40, a modulation and demodulation circuit 41, amplifiers 42 and 43, an infrared emitting diode 44 and a photodiode 45. The asynchronous transmission and reception circuit 40 is located between the switch circuit 29 and the modulation and demodulation circuit 40 so as to asynchronously transmit data to the modulation and demodulation circuit 41 and asynchronously receive data from the modulation and demodulation circuit 41. The modulation and demodulation circuit 41 modulates the transmission data by using an RZ (return to zero) code system, and outputs the modulated analog signal to the amplifier 42. Additionally, the modulation and demodulation circuit 41 demodulate analog data received from the amplifier 43, and outputs the serial data to the asynchronous transmission and reception circuit 40. It should be noted that the RZ code system is a system which emits an infrared transmission when the value of the data to be transmitted is "0", and infrared transmission is not emitted when the value of the data to be transmitted is "1". The infrared emitting diode 44 emits or stops an emission of an infrared light having a peak wavelength of 850 to 900 nanometers at an emission angle range of ±15 degrees to ±30 degrees in accordance with the current supplied thereto. The photodiode 45 provides an output when an infrared light is received.

Figure 4A:
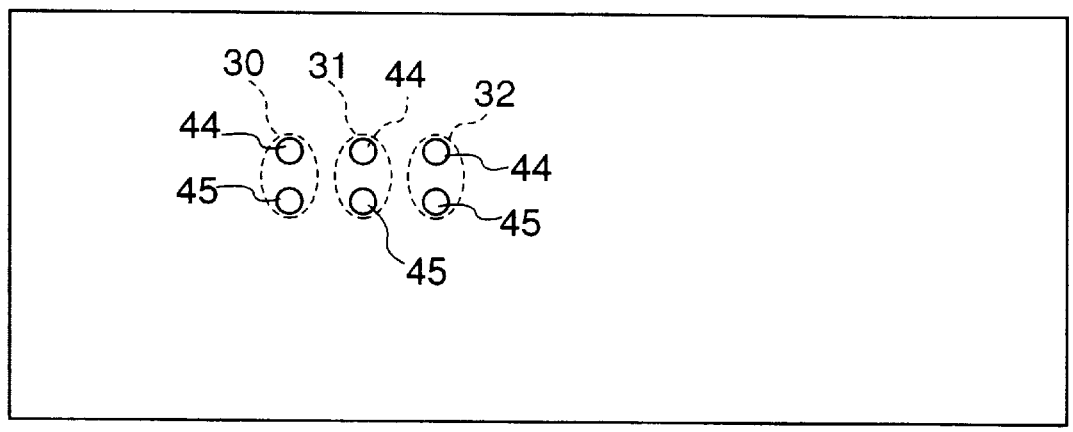
FIGS. 4A, 4B and 4C are illustrations for showing an example of a mounting construction of the infrared receiving and emitting modules shown in FIG. 2.
Figure 4B:
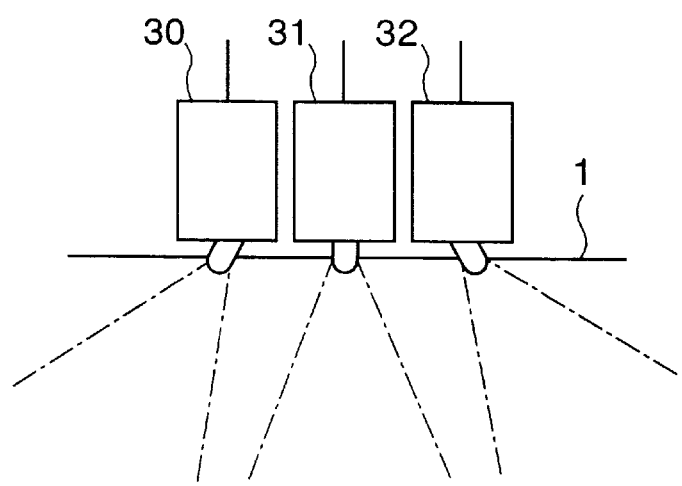
Figure 4C:
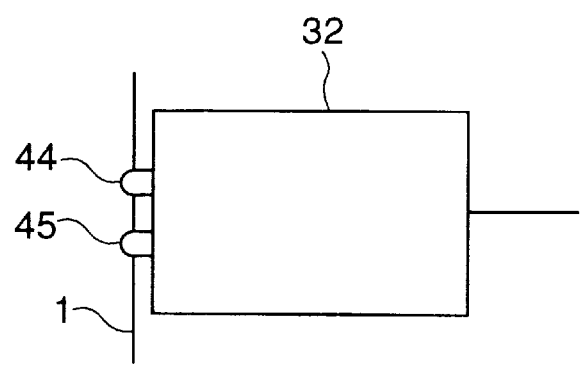

The three infrared receiving and emitting modules 30, 31 and 32 are mounted on a front side of the personal computer 1 so that the light emitting diode 44 and the photodiode 45 are directed outwardly in different directions, respectively. FIGS. 4A, 4B and 4C are illustrations for showing an example of a mounting construction of the infrared receiving and emitting modules 30, 31 and 32. FIG. 4A is a view from a front side. FIG. 4B is a view from above. FIG. 4C is a view from the right side of FIG. 4A. FIG. 4B also shows ranges of emission of an infrared light from each of the infrared receiving and emitting modules. It should be noted that the front side of the personal computer 1 is provided with a power switch and an insertion opening for a floppy disc or CD-ROM although these parts are not shown in the figures. The second infrared receiving and emitting module 31 is mounted so that the center line of the emitted infrared light is perpendicular to the front side of the personal computer 1. The first and third infrared receiving and emitting module are mounted so that the center lines of the emitted infrared lights are angled by 30 degrees with respect to the center line of the infrared light emitted from the second infrared receiving and emitting module 31.

It should be noted that positions of the first, second and third infrared receiving and emitting modules are not limited to the front side of the personal computer 1. For example, the first, second and third infrared receiving and emitting modules may be provided in an exclusive box which is separate from the personal computer 1 so that the light emitting diode 44 and the photodiode 45 are directed outwardly.

Figure 5:
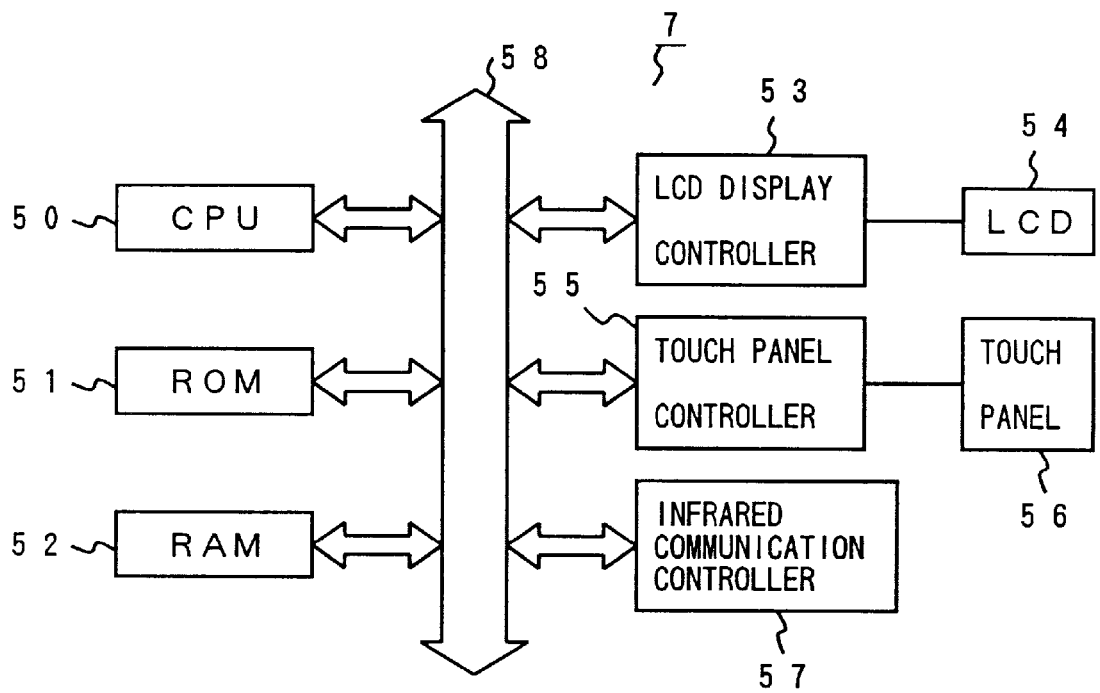
FIG. 5 is a block diagram of the drawing input device shown in FIG. 1.
Figure 7:
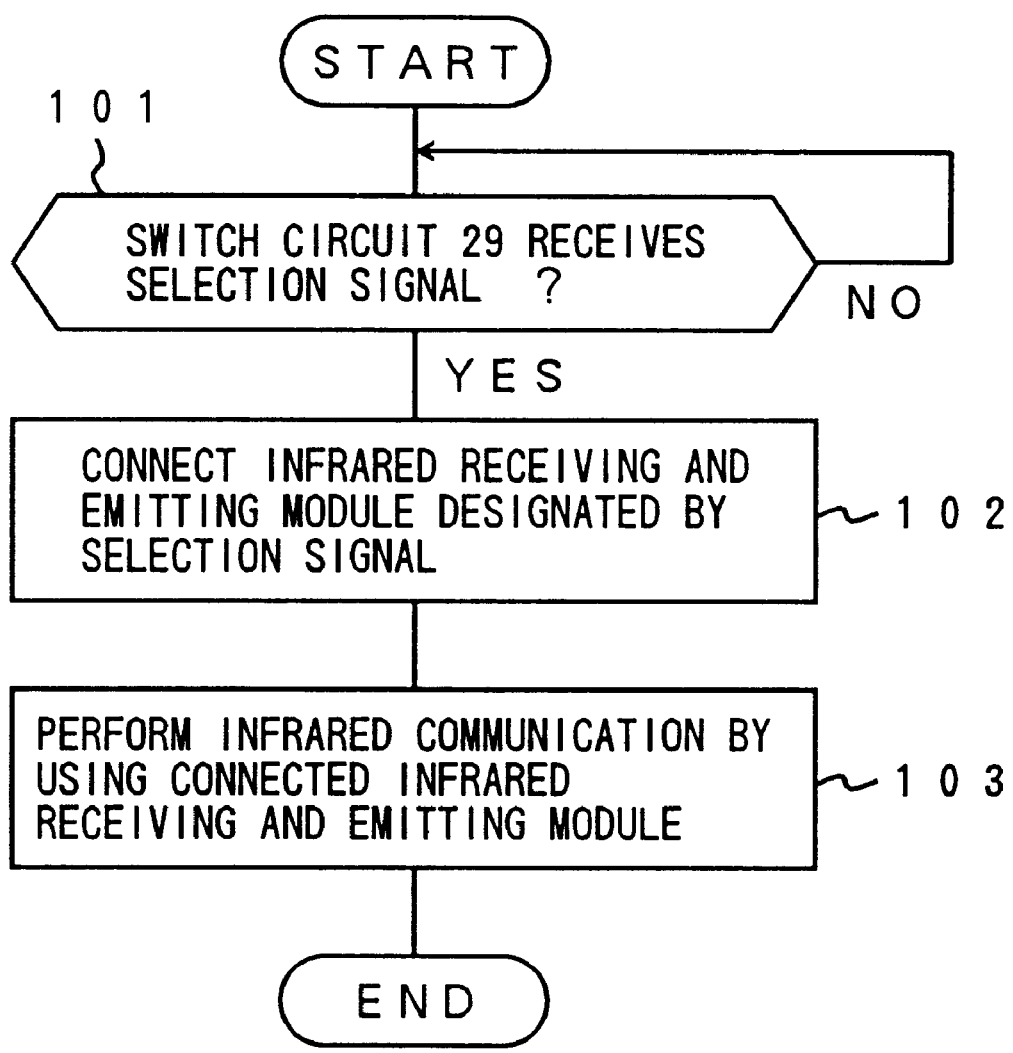
FIG. 7 is a basic operation of the wireless communication system according to the first embodiment of the present invention.

A description will now be given of the drawing input device 7 which performs infrared communication with the personal computer 1. FIG. 5 is a block diagram of the drawing input device 7. In FIG. 7, a CPU 50 controls an entire apparatus in accordance with control process programs stored in a ROM 51. The ROM 51 stores the programs for controlling the entire apparatus and for performing an infrared communication protocol according to the IrDA system. A RAM 52 is used as a work area of the CPU 50. Additionally, the RAM 52 is used as a buffer for the transmission data and the reception data when the infrared communication is performed.

An LCD controller 53 controls the display screen of the LCD 54. A touch panel controller 55 detects position of a touch panel 56 which is contacted by the electronic pen 8, and reads the positional information. The touch panel 56 adheres to the LCS 54 in an overlapped relationship. An infrared communication controller 57 is constituted by a serial-parallel conversion circuit and an infrared receiving and emitting module which have structures similar to the serial-parallel conversion circuit 28 and the first to third infrared receiving and emitting modules 30, 31 and 32 of the personal computer 1. A bus 58 is used for transferring data between the above-mentioned structural elements.

The drawing input device 7 displays a pen trace on the LCD 54 when a drawing is made by the electronic pen 8 on the touch panel 56 when the drawing input device 7 is set in a character input mode. Additionally, the Japanese syllabary and Chinese characters can be input in addition to alphabets and numbers by displaying a list of characters or numbers on the LCD 54. Further, a cursor displayed on the CRT 2 of the personal computer video conference system can be shifted by displaying a cursor shift key on the LCD 54 and pointing the cursor shift key. The character and drawing data input from the drawing input device 7 is displayed on the LCD 54, and is sent to the personal computer 1 by the infrared communication and also displayed on the CRT 2. When the personal computer video conference system is performing the conference communication and is set in a common blackboard mode, the personal computer 1 displays the display data on the CRT 2. At the same time, the display data is sent to the remote personal computer video conference system so as to display the display data on a remote side CRT. Additionally, the drawing input device 7 can also display the display data received from the personal computer 1 on the LCD 54.

Figure 6:
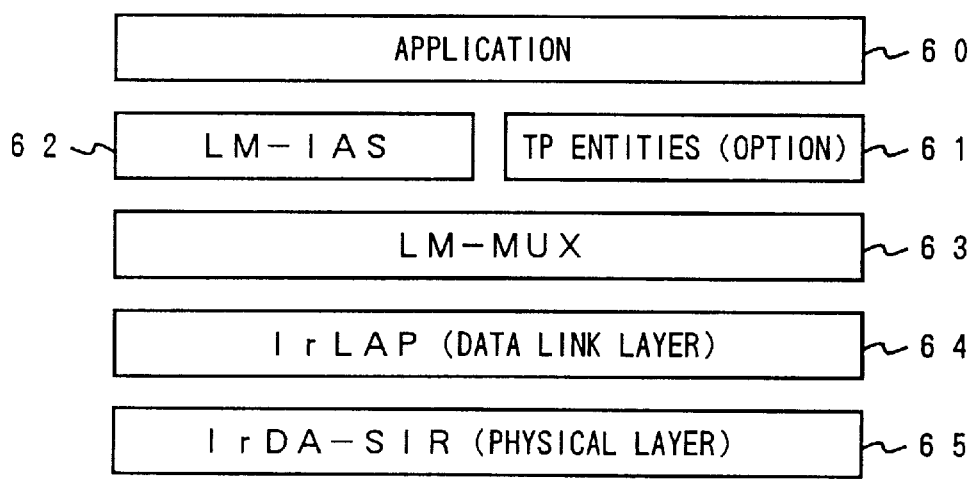
FIG. 6 is an illustration of a structure of a protocol according to the IrDA system.

A description will now be given of an infrared communication protocol according to the IrDA system. FIG. 6 is an illustration of a structure of the protocol according to the IrDA system.

In FIG. 6, the application 60 is, in the present embodiment, for transmitting character and drawing data or cursor shift instruction data. Transport protocol (TP) entities 61 perform a transport protocol (layer 4) of an open systems interconnection (OSI) reference model. This entity is a option. A link management information access service (LM-IAS) 62 exchanges information indicating what device is used for communication. The LM-IAS 62 and the TP entities 61 are located in the same layer, and one of them is selected and used for a single application. In the present embodiment, the LM-IAS 62 is used, and the TP entities are not used.

A link management multiplexer (LM-MUX) 63 can posses a plurality of service access points so that sets of data of a plurality of applications can be simultaneously processed. An infrared link access protocol (IrLAP) 64 is specified based on an unbalanced procedure class of high level data link control procedures (HDLC). In the unbalanced type procedure class, a first terminal and a second terminal are connected to each other, and one of the terminals is responsible for the control of the entire communication. In this case, the first terminal must be single, but the second terminal can be plural. In the present embodiment, the personal computer 1 corresponds to the first terminal, and the drawing input unit 7 corresponds to the second terminal. An IrDA serial infrared physical layer (IrDA-SIR) 65 specifies physical specifications of the infrared communication such as a modulation system.

In the present embodiment, the character or drawing data or the cursor shift instruction data is transmitted by using the infrared communication protocol according to the IrDA system. The protocols other than the IrDA-SIR 65 are performed by software.

In the personal computer video conference system, the serial-parallel conversion circuit 28 is connected to one of the first, second and third infrared receiving and transmitting modules 30, 31 and 32 by using the switch circuit 29. That is, as shown in a flowchart of FIG. 7, it is determined, in step 101, whether or not the switch circuit 29 receives a selection signal from the CPU 11. If it is determined that the switch circuit 29 receives the selection signal, the routine proceeds to step 102. In step 102, a previous connection of the switch circuit 28 is disconnected, and then the switch circuit 28 is connected to one of the first, second and third infrared receiving and emitting modules 30, 31 and 32 which is designated by the selection signal. Thereafter, in step 103, the personal computer 1 performs the infrared communication with the drawing input device 7 by using the connected one of the first, second and third infrared receiving and emitting modules 30, 31 and 32.

In the present embodiment, the personal computer 1 is provided with three infrared receiving and emitting modules each of which has a different direction of light emission, and one of the infrared receiving and emitting modules is used to perform wireless communication with the drawing input unit 7. Thus, a range (angle) in which the drawing input unit 7 is usable is expanded, resulting in improved convenience of operation of the system. Additionally, since the infrared wireless communication system can be constructed by use of inexpensive hardware and production cost of the system is reduced.

It should be noted that, in the above-mentioned embodiment, although each of the infrared modules includes the light receiving element and the light emitting element so as to perform bidirectional communication with the drawing input device, the present invention can be applied to a structure in which the infrared module has only a light receiving function. In such a case, the communication is performed only in a direction from the drawing input device 7 to the personal computer 1.

Figure 8:
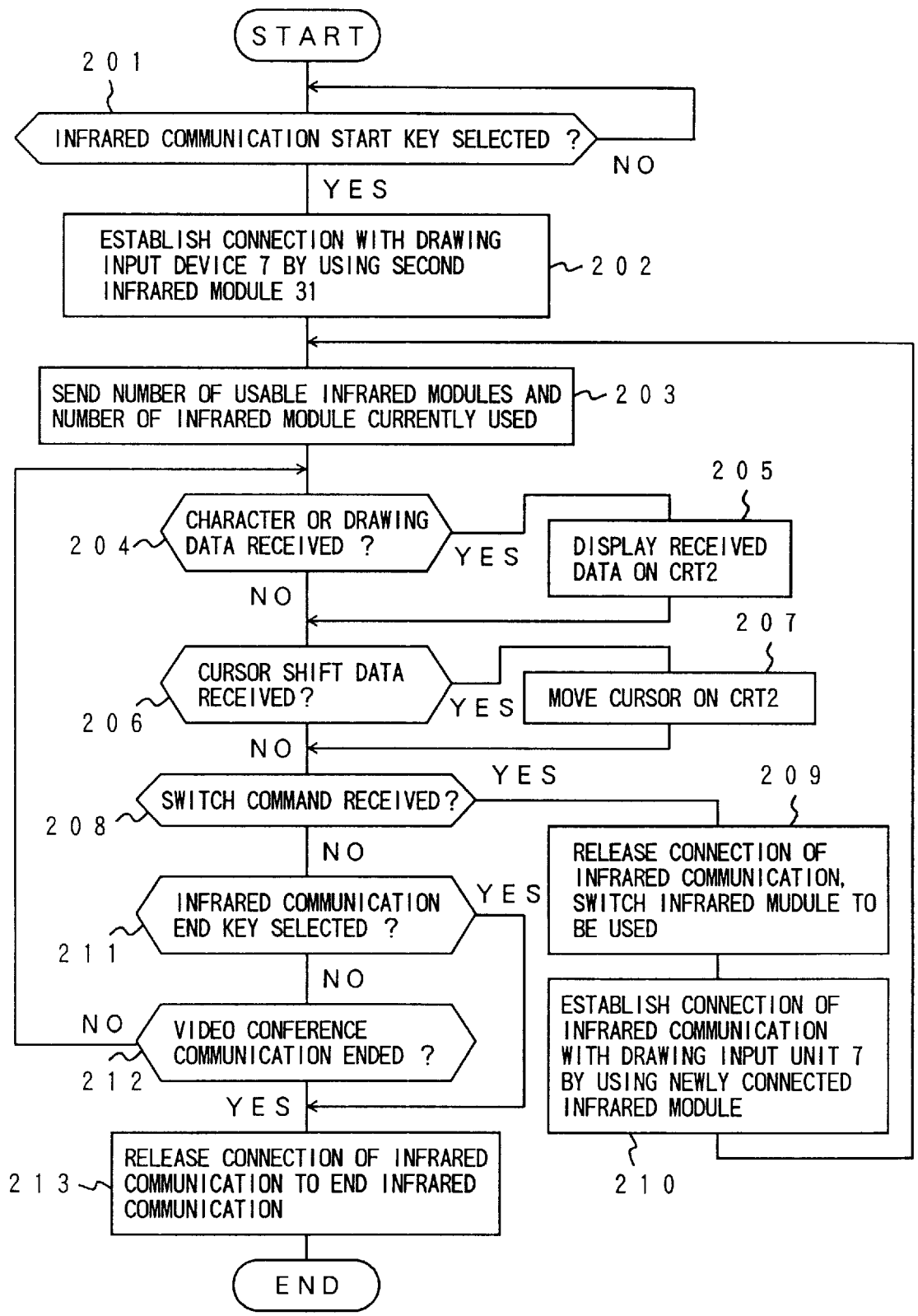
FIG. 8 is a flowchart of an operation performed by the personal computer in the second embodiment of the present invention.
Figure 9:
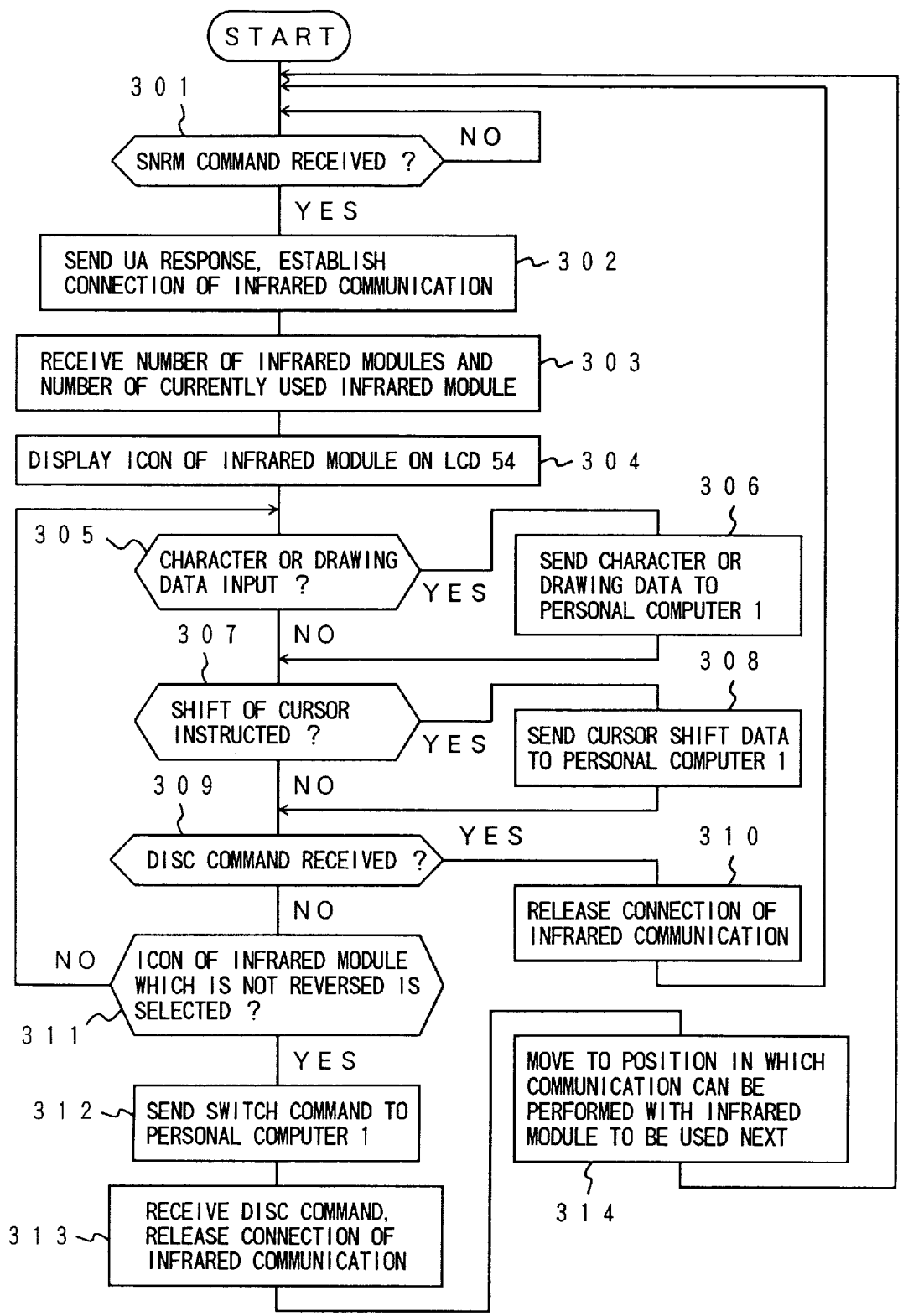
FIG. 9 is a flowchart of an operation performed by a drawing input device in the second embodiment of the present invention.

A description will now be given of a second embodiment according to the present invention. The structure of the second embodiment is the same as the structure of the above-mentioned first embodiment shown in FIG. 2. FIG. 8 is a flowchart of an operation performed by the personal computer 1 in the second embodiment. FIG. 9 is a flowchart of an operation performed by the drawing input unit 7 in the second embodiment.

In the present embodiment, the personal computer 1 of the personal computer video conference system starts infrared communication when it is determined, in step 201, that a key for starting communication with the drawing input unit 7 is selected. First, a connection of an infrared communication with the drawing input unit 7 is established, in step 201, by using the centrally located second infrared receiving and emitting module 31. Then, in step 203, the personal computer 1 sends information with respect to the number of usable infrared receiving and emitting modules and the number of the infrared receiving and emitting module which is currently used. That is, in the present embodiment, the personal computer 1 announces to the drawing input unit 1 the number 3 which is the number of usable modules, and the number 2 which is the number of the currently used module.

In the drawing input unit 7, it is determined whether or not an SNRM command which will be described later is received. If it is determined that the SNRM command is received, the drawing input unit 7 sends back, in step 302, an UA response to the personal computer 1 so as to establish connection of an infrared communication. Then, in step 303, the drawing input unit 7 receives the number 3 which represents the number of the usable infrared module and the number 2 as the currently used infrared module. Icons corresponding to the first to third infrared modules are displayed on an LCD 54 in step 304. The icon which corresponds to the currently used infrared module 31 is displayed in a reversed contrast.

Figure 10:
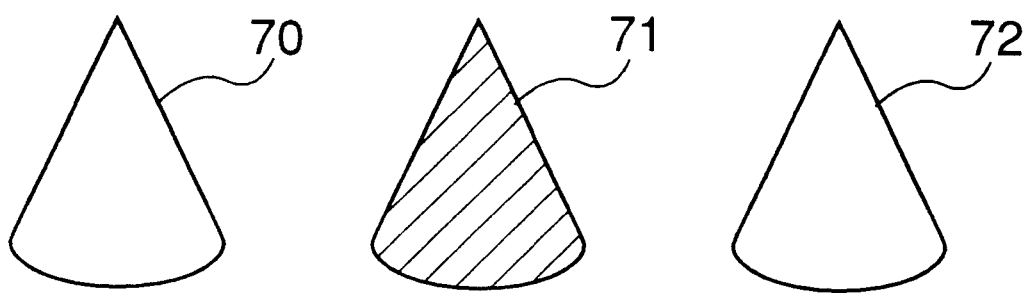
FIG. 10 is an illustration of icons corresponding to infrared modules displayed on a display of the drawing input unit.

FIG. 10 is an illustration of the icons corresponding to the infrared modules displayed on the display 54. In FIG. 10, the icon 70 corresponds to the first infrared module 30, the hatched icon 71 which is in the reversed contrast corresponds to the second infrared module 31, and the icon 72 corresponds to the third infrared module 32.

After the icons corresponding to the infrared modules are displayed, the drawing input unit 7 is set in a state in which the drawing input unit 7 can send to the personal computer 1 data such as character or drawing data or cursor shift data. That is, it is determined, in step 305, whether or not the character or drawing data is input. If the character or drawing data is input, the character data is sent to the personal computer 1 in step 306. If the character or drawing data is not input, it is then determined, in step 307, whether or not an instruction for a shift of the cursor is made. If affirmative, the cursor shift data is sent to the personal computer 1 in step 308. If the character or drawing data and the cursor shift data are not input, it is then determined, in step 309, whether or not a disconnect (DISC) command is received. If the DISC command is received, the connection of the infrared communication is released in step 310. If the DISC command is not received, the routine proceeds to step 311. In step 311, it is determined whether the icon which is not in the reversed contrast is selected. If the determination of step 311 is affirmative, that is, if the icon 70 which is not reversed is pointed by the electronic pen 8, the routine proceeds to step 312. In step 312, the drawing input unit 7 sends to the personal computer 7 a switching command which instructs switching of the infrared modules to the first infrared module 30.

The personal computer 1 determines, in step 208, whether or not the switching command is received. If it determined that the switching command is received, the routine proceeds to step 209. In step 209, the connection of the infrared communication is released, and the infrared module to be used is switched to the first infrared module 30 by the switch circuit 29. Then, in step 210, an establishment of a connection with the drawing input unit 7 using the first infrared module 30 is attempted.

Figure 11:
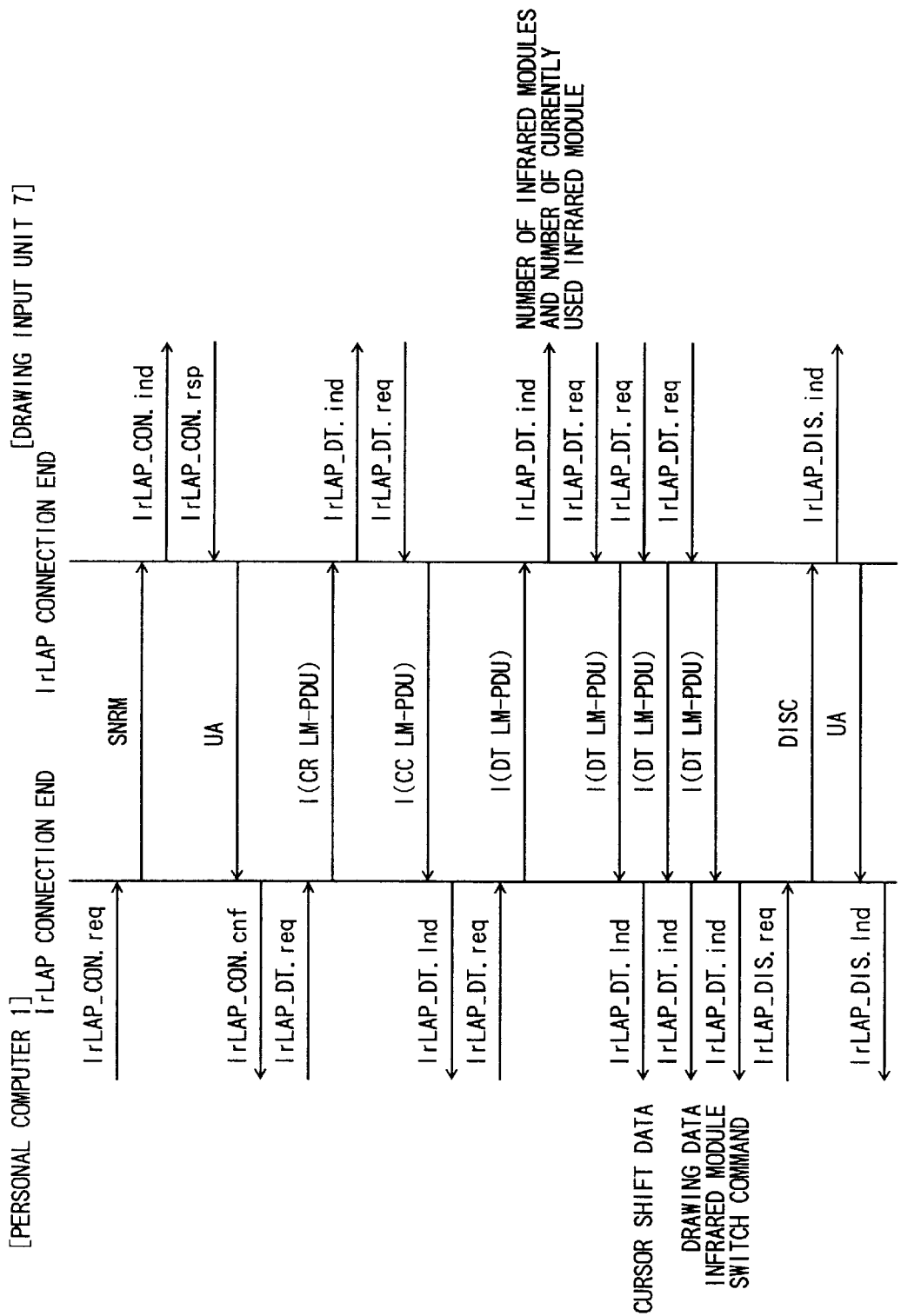
FIG. 11 is an illustration for explaining a sequence of an infrared communication operation.

A description will now been given, with reference to FIG. 11, of a protocol sequence between the personal computer 1 and the drawing input unit 7 using the second infrared module 31 from establishment of a connection to a release of the connection. It should be noted that an indication of a receive ready (RR) signal between the end terminals of the IrLAP connection is omitted.

Operations for establishing the connection between the infrared communication applications will be described separately with respect to the personal computer 1 and the drawing input unit 7. A description will now be given of an operation of the personal computer 1.

In the main unit of the personal computer video conference system, when the communication start key for communication with the drawing input unit 7 is selected, the infrared communication application 60 sends to the LM-IAS 62 a connection establishment request. This message is announced to the IrLPA 64 via the LM-MUX 63. The IrLAP 64 sends a set normal response command (SNRM) to the drawing input unit 7 when the connection establishment request is received. Then, the IrLAP 64 sends a data link connection establishment confirmation (IrLAP-CON.cnf) to the LM-MUX 63 when an unnumbered acknowledgement (UA) response is received from the drawing input unit 7. The LM-MUX 63, when receiving this message, sends to the IrLAP 64 a connect request link management-protocol data unit (CR LM-PDU) by including it in a data request message (IrLAP-DT.req). The IrLAP 64 sends this information to the drawing input unit 7 by including it in an information frame (I frame). Thereafter, when an I frame containing a connect confirm link management-protocol data unit (CC LM-PDU) is received from the drawing input unit 7, the IrLAP 64 sends a data indication (IrLAP-DT.ind) to the LM-MUX 63. Upon receipt of the data indication, the LM-MUX 63 sends a connection establishment confirmation to the infrared communication application 60 via the LM-IAS 62.

A description will now be given of an operation of the drawing input unit 7.

When the IrLAP 64 receives the SNRM command from the other part, the IrLAP 64 sends to the LM-MUX 63 a data link connection establishment indication (IrLAP-CON.ind). Upon receipt of the message, the LM-MUX 63 sends back a response (IrLAP-CON.res) to the IrLAP 64. Upon receipt of the message, the IrLAP 64 sends the UA response to the personal computer 7. Thereafter, when the IrLAP 84 receives the I frame containing the CR LM-PDU from the personal computer 7, the IrLAP 64 sends the data indication (IrLAP-DT.ind) to the LM-MUX 63. Upon receipt of the data indication, the LA-MUX 63 sends the connection establishment indication to the infrared communication application 60 via the LM-IAS 62. Upon receipt of the indication, the infrared communication application 60 sends the response message to the LM-MUX 63 via the LM-IAS 62. Upon receipt of the response, the LM-MUX 63 sends the CC LM-PDU to the IrLAP 64 by including it in a data request (IrLAP-DT.req). The IrLAP 64 sends the information to the personal computer 7 by including it in the I frame.

The above-mentioned operation for establishing the infrared communication corresponds to the process of steps 201 and 202 of FIG. 8 and the process of steps 301 and 302. After the connection is established, the personal computer 1 sends to the drawing input unit 7 information with respect to the number of infrared modules which can be used and the number of the infrared module which is currently used, the information being included in the data link management-protocol data unit (DT LM-PDU). Thereafter, the drawing input unit 7 sends cursor shift instruction data or drawing data to the personal computer 1 by including it in the DT LM-PDU. Then, when an icon of the infrared module displayed on the LCD 54 of the drawing input unit 7 which is not reversed is selected by the user, the drawing input unit 7 sends a switching command for the infrared module to the personal computer 7 by including it in the DT LM-PDU. Upon receipt of the command, the infrared communication application 60 of the personal computer 70 sends a connection release request to the LM-IAS62. The request message is announced to the IrLAP 64 via the LM-MUX 63.

Upon receipt of the request message, the IrLAP 64 sends a disconnect command (DISC). The IrLAP 64 of the drawing input unit 7 then sends the UA response to the personal computer 1, and at the same time sends a disconnect indication (IrLAP-DIS.ind) message to the LM-MUX 63. The LM-MUX 63 sends the disconnect indication message to the infrared communication application 50 via the LM-IAS 62.

On the other hand, upon receipt of the UA response, the IrLAP 64 of the personal computer 64 the disconnect indication (IrLAP-DIS.ind) message to the LM-MUX 63. The LM-MUX 63 sends the disconnect indication message to the infrared communication application 60 via the LM-IAS 62. In this manner, the connection between the infrared communication applications is released. The above-mentioned operation corresponds to the process of steps 203 to 209 of FIG. 8 and the process of steps 303 to 313 of FIG. 9.

Then, the personal computer 1 switches the connection to the infrared module which is designated by the drawing input unit 7 by using the switch circuit 29. This operation corresponds to the process of step 209. In the present embodiment, since the designated number of the infrared module is "1", the first infrared module 30 is set in a usable condition. Then, the infrared communication application 60 of the personal computer 1 sends the connection establishment request to the LM-IAS 62. Thereafter, in step 210 of FIG. 8, the connection with the drawing input unit 7 is established in the same manner mentioned above. It should be noted that upon receipt of the connection establishment request, the IrLAP 64 of the personal computer 7 repeatedly sends the SNRM command at a predetermined time interval, and waits for the UA response from the drawing input unit 7. When the user moves, in step 314 of FIG. 9, the drawing input unit 7 to a position in which the drawing input unit 7 can communicate with the first infrared module 30, the drawing input unit 7 receives the SNRM command ("yes" of step 301 of FIG. 9). Then, in step 302, the drawing input unit 7 sends back the UA response to the personal computer 1. Accordingly, the connection establishment procedure is started.

After the connection is established, the drawing input unit 7 sends to the personal computer 1 character or drawing data or cursor shift data ("yes" of the determination step 305 of FIG. 9 to step 306, or "yes" of the determination step 307 to step 308 of FIG. 9). Then, when a communication end key for the communication with the drawing input unit 7 is selected in the main unit of the personal computer video conference system ("yes" of the determination step 211), or when the video conference is ended ("yes" of the determination step 212), the connection between the infrared communication applications is released, and the infrared communication is ended (step 213).

As mentioned above, according to the present embodiment, since the user can designate one of the infrared modules from among three infrared modules each of which is oriented in a different direction, the system can be conveniently used when the drawing input unit 7 is used by a plurality of people.

Figure 12:
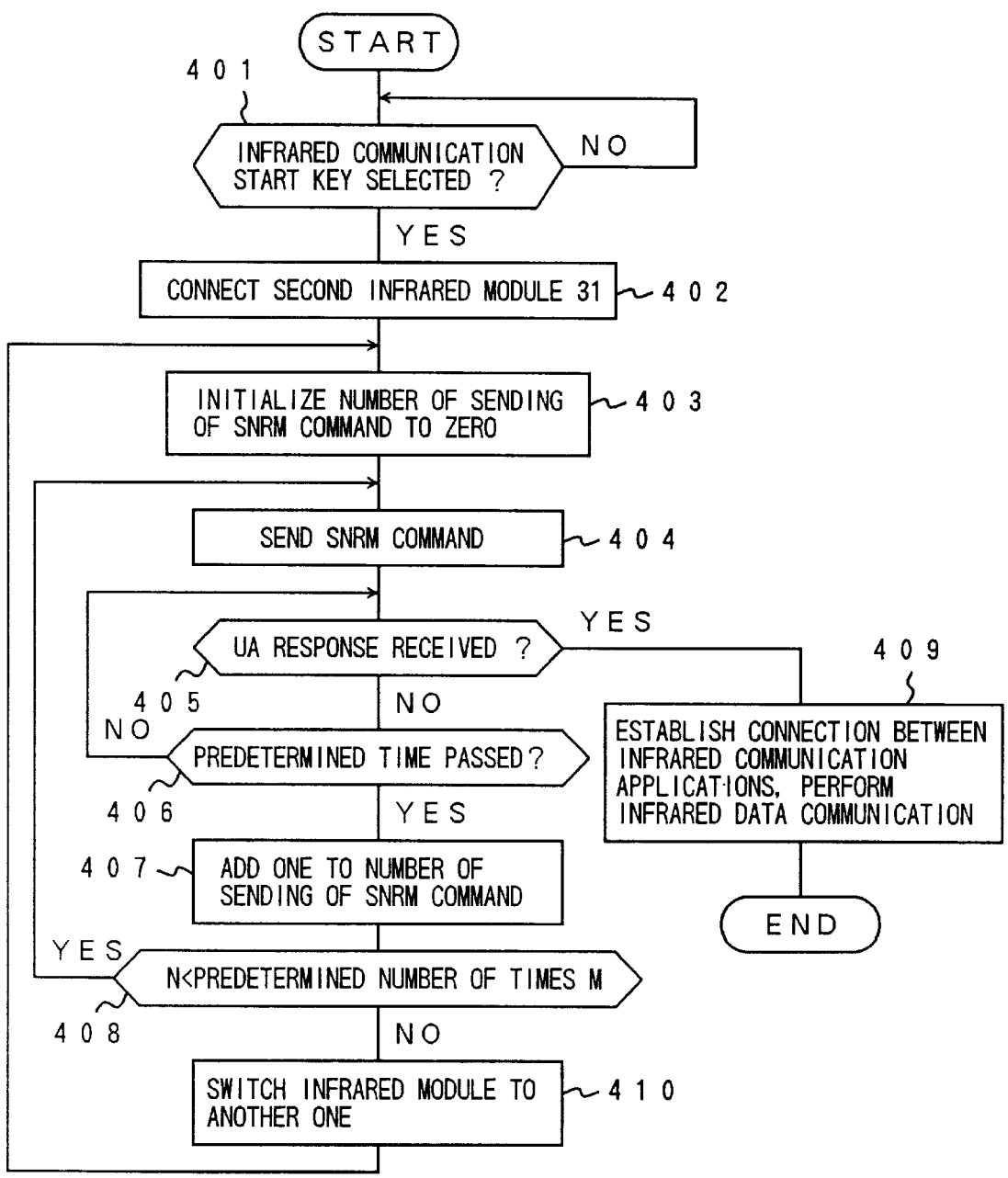
FIG. 12 is a flowchart of an operation of a personal computer provided in the third embodiment of the present invention.

A description will now be given of a third embodiment of the present invention. FIG. 12 is a flowchart of an operation of a personal computer provided in the third embodiment.

In the personal computer video conference system according to the third embodiment, it is determined, in step 401, whether or not a start key for starting an infrared communication with the drawing input unit 7 is selected. If the start key is selected, the second infrared module 31 is connected, in step 402, by using the switch circuit 29 so as attempt an establishment of the connection with the drawing input unit 7. That is, the IrLAP 64 of the personal computer 1 sends the SNRM command a predetermined number of times at a predetermined time interval. This operation corresponds to the loop of step 403, step 404, "no" of step 405, "yes" of step 406, step 407 and "no" of step 408. If the UA response id received from the drawing input unit 7, the connection between the infrared communication applications is established. This operation corresponds to the process of "yes" of step 405 to step 409. Thereafter, character or drawing data or cursor shift data is sent from the drawing input unit 7 to the personal computer 1 by an operation of the user on the drawing input unit 7.

When the UA response is not received from the drawing input unit 7, the connection is switched from the second infrared module 31 to the third infrared module 32 by using the switch circuit 29. This operation correspond to the process of "no" of step 408 to step 410. Then, the SNRM command is sent a predetermined number of times at a predetermined time interval in the same manner as mentioned above. If the UA command is not received from the drawing input unit 7, the connection is switched from the third infrared module 32 to the first infrared module 30. As mentioned above, the infrared module to be used is switched sequentially so as to attempt establishment of the connection. Then, the infrared communication applications is established when the UA response is received from the drawing input unit 7.

As mentioned above, according to the present embodiment, since the establishment of the connection with the drawing input unit 7 is attempted by sequentially switching the connection to one of the three infrared modules provided in the personal computer 7, each of which is oriented in a different direction, at a predetermined time interval, the operator is not required to designate the infrared module to be used, resulting in a convenient use of the system.

A description will now be given of a fourth embodiment of the present invention. In the system according to the fourth embodiment of the present invention, a plurality of drawing input units are provided, the number of drawing input units is the same as the number of infrared modules provided in the personal computer 1, and the drawing input units are located in positions corresponding to the respective infrared modules.

Figure 13:
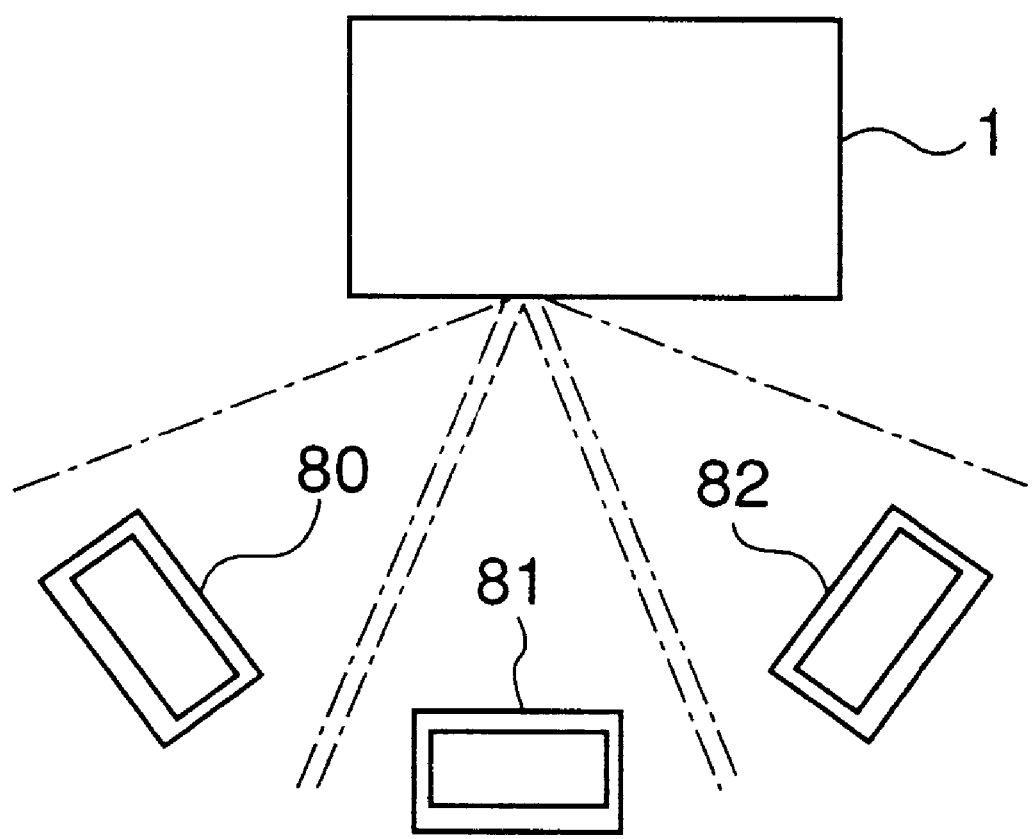
FIG. 13 is an illustration for explaining a positional relationship between the drawing input units and the personal computer in the third embodiment of the present invention.
Figure 14:
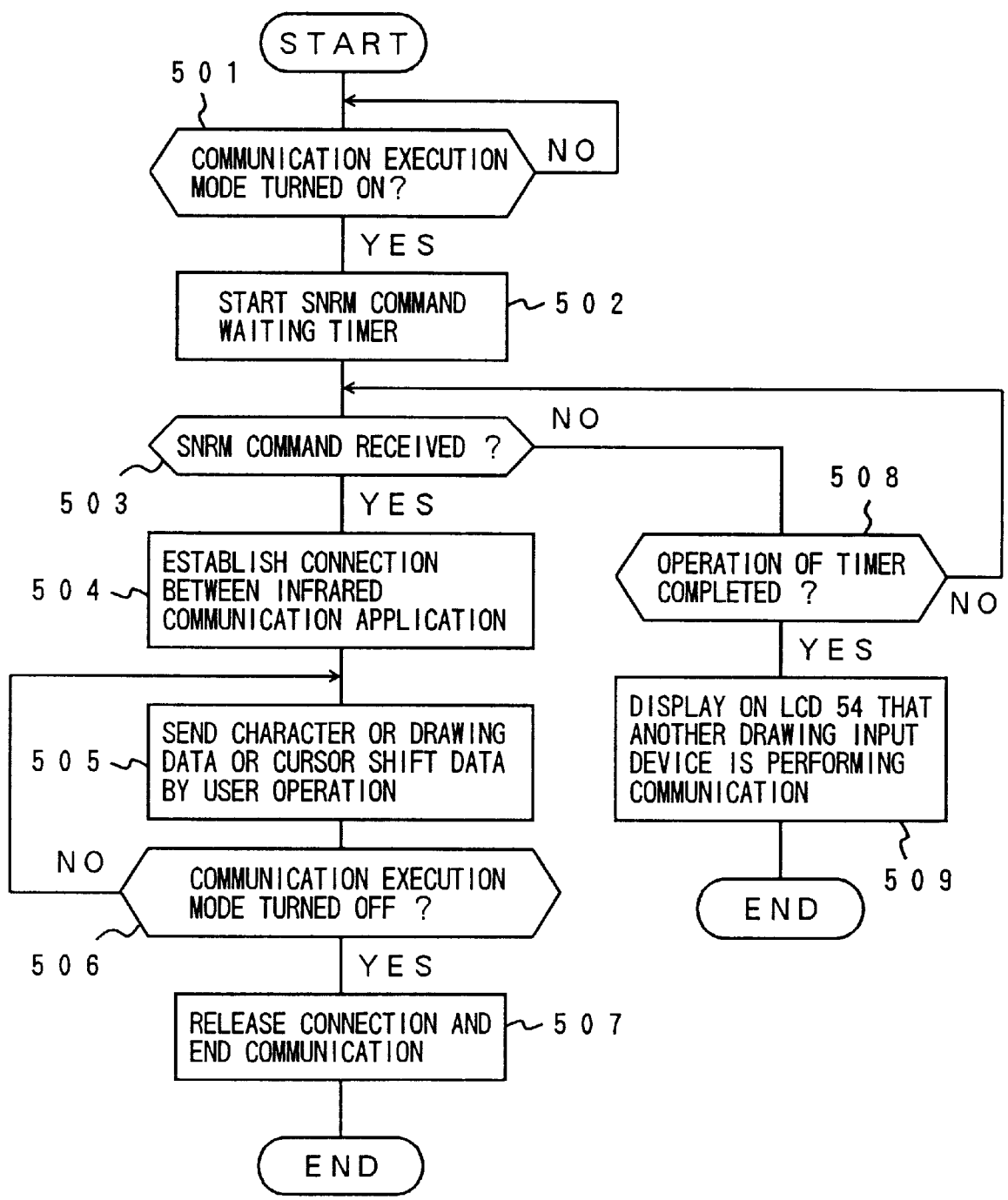
FIG. 14 is a flowchart of an operation of each of the drawing input units provided in a fourth embodiment of present invention.

FIG. 13 shows a positional relationship between the drawing input units and the personal computer 1. Each of the drawing input units 80, 81 and 82 is located in a position in which communication can be performed with a respective one of the first, second and third infrared modules 30, 31 and 32. The establishment of the connection is the same as that described above. FIG. 14 is a flowchart of an operation of each of the drawing input units provided in the fourth embodiment.

Each of the drawing input units can be set either in a mode in which a communication can be performed with the personal computer 1 or a mode in which a communication cannot be performed with the personal computer 1. A key for switching the mode (communication execution mode) is displayed on the LCD 54. If a user of the drawing input unit 80 turns on the communication execution mode ("yes of" the determining step 501) in a situation in which the communication execution mode of each of the drawing input units 80, 81 and 82 is off, the IrLAP 64 of the drawing input unit 80 starts an operation of an SNRM command waiting timer (step 502), and waits for the reception of the SNRM command (step 503). Then, when the SNRM command is received, the UA response is sent to establish the connection between the infrared communication applications ("yes" of the determination step 503 to step 504). Then, character or drawing data or cursor shift data is sent to the personal computer 1 by an operation of the user (step 505). When the user of the drawing input unit 80 turns off the communication execution mode ("yes" of the determination step 506), the connection between the infrared communication applications is released, and the communication is ended (step 507).

A description will now be given of a case in which the communication execution mode is turned on in one of the drawing input units other than the drawing input unit 80 by the user while the drawing input unit 80 is performing infrared communication. In such a case, although the IrLAP 64 waits for the reception of the SNRM command from the personal computer 1, the operation of the SNRM command waiting timer is ended ("no" of the determination step 503 to "yes" of the determination step 508). Then, the LCD 54 displays that another drawing input unit is performing a communication (step 509).

As mentioned above, according to the present embodiment, since only one of the drawing input units which requests an infrared communication establishes the connection to perform the infrared communication, there is no unnecessary establishment of a connection of the drawing input unit, resulting in a convenient use of the system.

A description will now be given of a fifth embodiment of the present invention.

Figure 15:
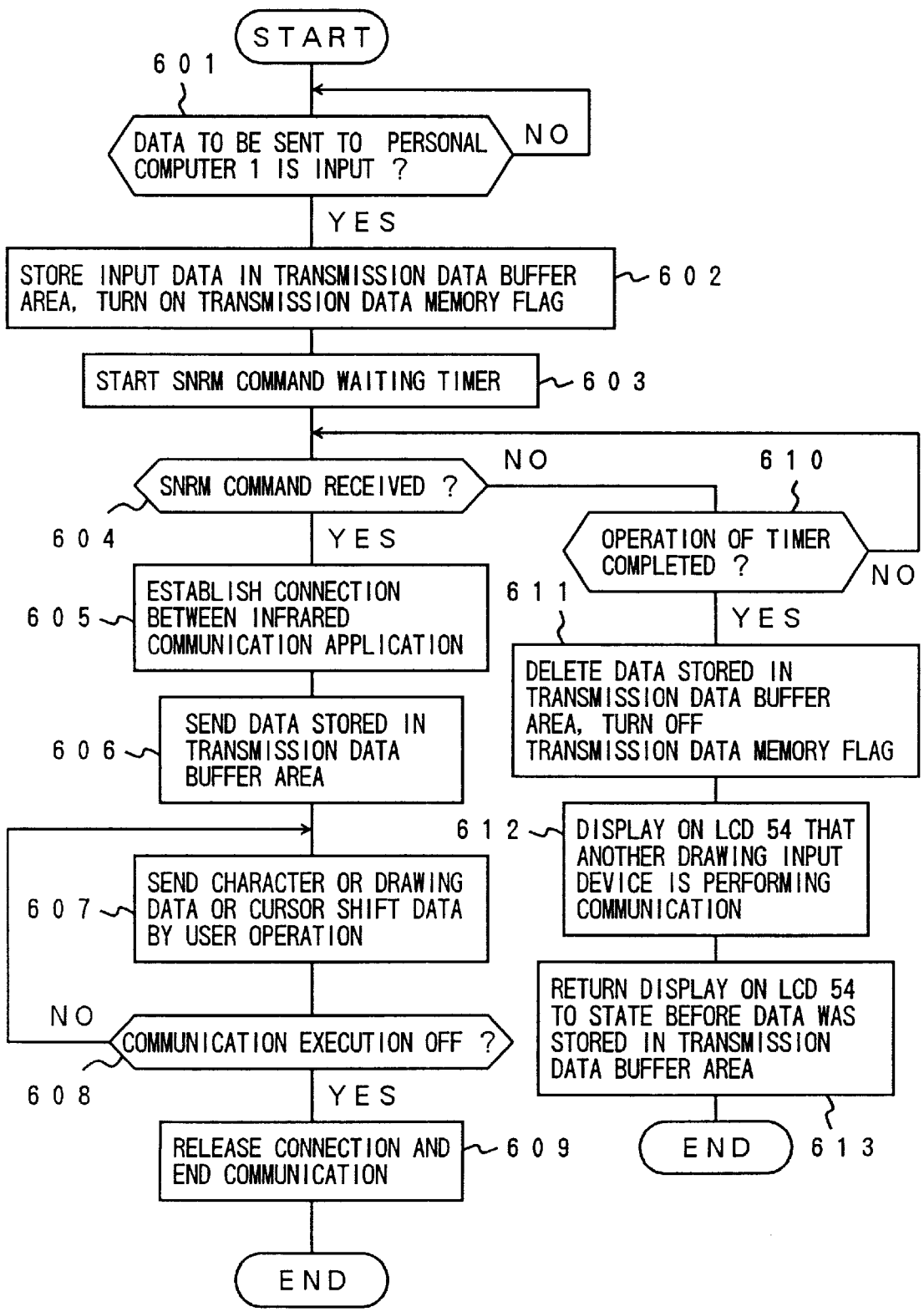
FIG. 15 is a flowchart of an operation of each of the drawing input units provided in a fifth embodiment.

In the personal computer video conference system according to the fifth embodiment, similar to that shown in FIG. 13, a plurality of drawing input units 80, 81 and 82 are provided, the number of drawing input units being the same as the number of infrared modules provided in the personal computer 1, and the drawing input units 80, 81 and 82 are located in positions corresponding to the respective infrared modules. The establishment of the connection is the same as that described above. FIG. 15 is a flowchart of an operation of each of the drawing input units provided in the fifth embodiment.

When all the drawing input units 80, 81 and 82 are not performing infrared communication, and if character or drawing data is input or a cursor shift key is pointed in the drawing input unit 80 ("yes" of the determination step 601), the data is stored in a transmission data buffer area assigned in the RAM 52 (step 602). Additionally, a variable flag is turned on which is defined in a program and represents that data is stored in the transmission data buffer area. Then, the IrLAP 64 of the drawing input unit 80 starts the SNRM command waiting timer (step 603), and waits for the reception of the SNRM command from the personal computer 1 (step 604). Upon receipt of the SNRM command, the drawing input unit 80 sends the UA response so as to establish the connection between the infrared communication applications ("yes" of the determination step 604 to step 605). Then, the drawing input unit 80 sends the data stored in the transmission data buffer area to the personal computer 1 (step 606). Thereafter, the character or drawing data or cursor shift data is sent to the personal computer 1 by an operation of the user, if necessary (step 607 to "no" of the determination step 608).

In the present embodiment, a key for switching the communication execution mode is displayed on the LCD 54. When the connection is established, the communication execution mode is turned on. That is, the operation of the user to turn on the communication execution mode is eliminated, when the user of the drawing input unit 80 turns off the communication execution mode, the connection between the infrared communication applications is released, and the communication is ended ("yes" of the determination step 608 to step 609).

Additionally, when the drawing input unit 80 is performing infrared communication, and if character or drawing data is input or a cursor shift key is pointed in other drawing input unit, the data is stored in a transmission data buffer area assigned in the RAM 52 (step 602). Additionally, the variable flag is turned on which represents that data is stored in the transmission data buffer area. Then, the IrLAP 64 of the other drawing input unit starts the SNRM command waiting timer, and waits for the reception of the SNRM command from the personal computer 1. In this case, the operation of the SNRM command waiting timer is completed ("no" of the determination step 604 to "yes" of the determination step 610). The data stored in the transmission data buffer area is deleted, and the flag which represents the storage of the data in the transmission data buffer area is turned off (step 611). Then, the LCD 54 displays that another drawing input unit is performing communication (step 612). Additionally, the display is returned to the state before the character or drawing data was stored in the transmission data buffer area (step 613).

As mentioned above, according to the present embodiment, since only one of the drawing input units which requests an infrared communication establishes the connection to perform the infrared communication, there is no unnecessary establishment of a connection of the drawing input unit, resulting in a convenient use of the system. Additionally, in the present embodiment, the operation of the user to start the infrared communication, that is, the switching operation for the communication execution mode is eliminated, the convenience of use of the system is further improved.

It should be noted that the same effects and advantages may be obtained if the personal computer in the above-mentioned embodiments is replaced by a regular video conference apparatus. Additionally, the drawing input unit may be replaced by an operational key-pad.

Figure 16:
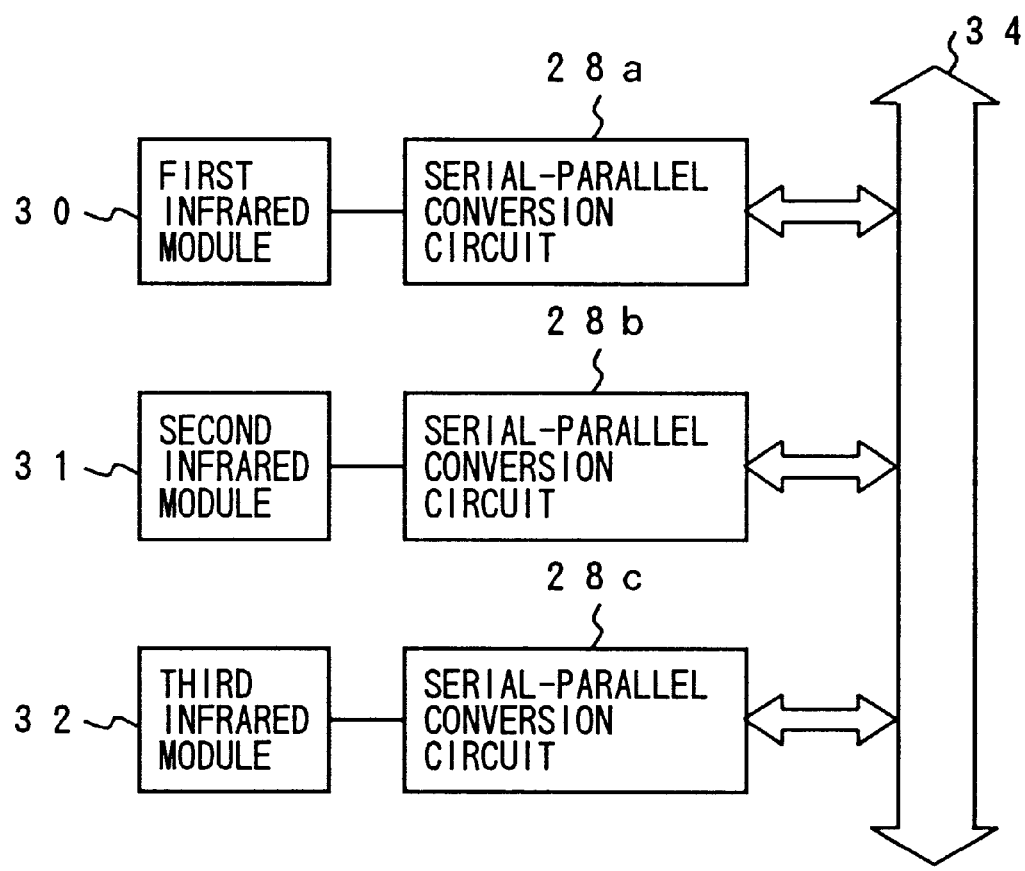
FIG. 16 is a block diagram of a structure in which infrared modules and serial to parallel conversion circuits are connected.

In the personal computer television conference, the switch circuit 29 for switching the infrared module to be used may be eliminated by mounting serial to parallel conversion circuit to each of the infrared modules. FIG. 16 is a block diagram of the structure in which the infrared modules and the serial to parallel conversion circuits are connected. In this case, the selection of the infrared module to be used is not performed by an operation of the switch but selection is made by one of the serial to parallel conversion circuits 28a, 28b and 28c. Thus, also in this case, the same effects and advantages with the above-mentioned embodiments can be obtained.

Additionally, the present invention may be applied to a television game system in which wireless communication is performed between a main unit and a plurality of operational units.

The present invention is not limited to the specifically disclosed embodiments, and variations and modifications may be made without departing from the scope of the present invention.

What is claimed is:

1. A wireless communication system comprising:

a data sending unit; and a data processing unit remote from said data sending unit, said data processing unit including a plurality of wireless data communication units each of which includes a wireless data receiving element configured to receive data transmitted by wireless communication from said data sending unit, said wireless data communication units being oriented to receive data transmitted from a plurality of different angle ranges with respect to a directivity of emissions from said data sending unit, and an angle selecting mechanism configured to exclusively select one of said plurality of wireless data communication units as a selected wireless data communication unit based on an angle range in which said data sending unit is located based on a selection command provided from said data sending means, wherein said data processing unit being configured to establish an exclusive bi-directional wireless communication channel in which said data processing unit and said data sending unit perform bi-directional wireless communication through said selected wireless data communication unit that was selected by the data processing unit.

2. The system of claim 1, wherein:

each of said plurality of wireless data communication units includes a wireless data transmitting element configured to transmit data to said data sending unit through said exclusive bi-directional wireless communication channel.

3. The system of claim 2, wherein:

said data processing unit is configured to establish said exclusive bi-directional wireless communication channel with said data sending unit by sequentially switching said wireless data communication units at a predetermined time interval so that said bi-directional wireless communication is performed when said exclusive bi-directional wireless communication channel is established.

4. The system of claim 3, wherein:

said data sending unit comprises a plurality of data sending units, each of said plurality of data sending units is configured to be set in a communication mode in which said bi-directional wireless communication with said data processing unit is permitted, one of said plurality of data sending units being set in said communication mode by sending a response to said data processing unit so as to establish said exclusive bi-directional wireless communication channel when said one of said plurality of data sending units receives a request for establishing said exclusive bi-directional wireless communication channel from said data processing unit, and said exclusive bi-directional wireless communication channel being disconnected when said communication mode is canceled.

5. The system of claim 4, wherein:

said one of said plurality of data sending units conveys an instruction by an operator to set and cancel said communication mode.

6. The system of claim 3, wherein:

a plurality of other data sending units are provided, each of said other data sending units being provided with a data buffer so that one of said plurality of other data sending units stores data to be transmitted to said data processing unit in said data buffer when a communication channel between one of said plurality of other data sending units and said data processing unit is not established, said one of said plurality of other data sending units configured to send a response to said data processing unit so as to establish said exclusive bi-directional wireless communication channel when said one of said plurality of other data sending units receives a request for establishing said exclusive bi-directional wireless communication channel from said data processing unit so as to send the data stored in said data buffer to said data processing unit.

7. The system of claim 1, wherein:

the exclusive bi-directional wireless communication channel transmits data via an infrared transmission.

8. The system of claim 1, wherein:

said data processing unit being a main unit of a video conference system, and said data sending unit being a peripheral unit of said video conference system configured to input data to said main unit.

9. A wireless communication system comprising:

data sending means for sending data;

data processing means, remote from said data sending means, for processing data received from said data sending means, said data processing means including bi-directional data communication means for communicating with said data sending means by using bi-directional wireless communication, said bi-directional data communication means includes means for receiving data transmitted in a plurality of angle ranges with respect to a directivity of emissions from said bi-directional data communication means; and angle range selecting means for exclusively selecting one of said plurality of angle ranges in which said data sending means is located based on a selection command provided from said data sending means.

10. The system of claim 9, wherein:

said bi-directional data communication means includes means for transmitting data to said data sending means via bi-directional wireless communication.

11. The system of claim 9, wherein:

said data processing means includes means for attempting to establish an exclusive bi-directional wireless communication channel with said data sending means by sequentially switching said angle ranges at a predetermined time interval so that the bi-directional wireless communication is performed when said exclusive bi-directional wireless communication channel is established.

12. A data processing unit configured to communicate data via bi-directional wireless communication with a data sending unit remote from said data processing unit, said data processing unit comprising:

a plurality of wireless data communication units each of which includes a wireless data receiving element configured to receive data transmitted from said data sending unit, said wireless data communication units being oriented to receive data transmitted from a plurality of different angle ranges with respect to a directivity of emissions from said data sending unit; and an angle selecting means for selecting one of said wireless data communication units based on an angle range in which said data sending unit is located so that said data processing unit bi-directionally communicates with said data sending unit by using said one of said wireless data communication units.

13. The data processing unit of claim 12, wherein:

said data sending unit is configured to provide a selection command used by said selecting means to make a selection.

14. The data processing unit of claim 12, wherein:

each of said wireless data communication units includes a wireless data transmitting element configured to transmit data to said data sending unit by bi-directional wireless communication.

15. The data processing unit as claimed in claim 14, further comprising:

connection establishing means for attempting to establish an exclusive bi-directional wireless communication channel with said data sending unit by sequentially switching said wireless data communication units at a predetermined time interval so that the bi-directional wireless communication is performed when said exclusive bi-directional wireless communication channel is established.

* * * * *